June 9, 1925.
J. T. TERRY
1,541,293
PROCESS OF TREATING ORES
Filed Oct. 29, 1924
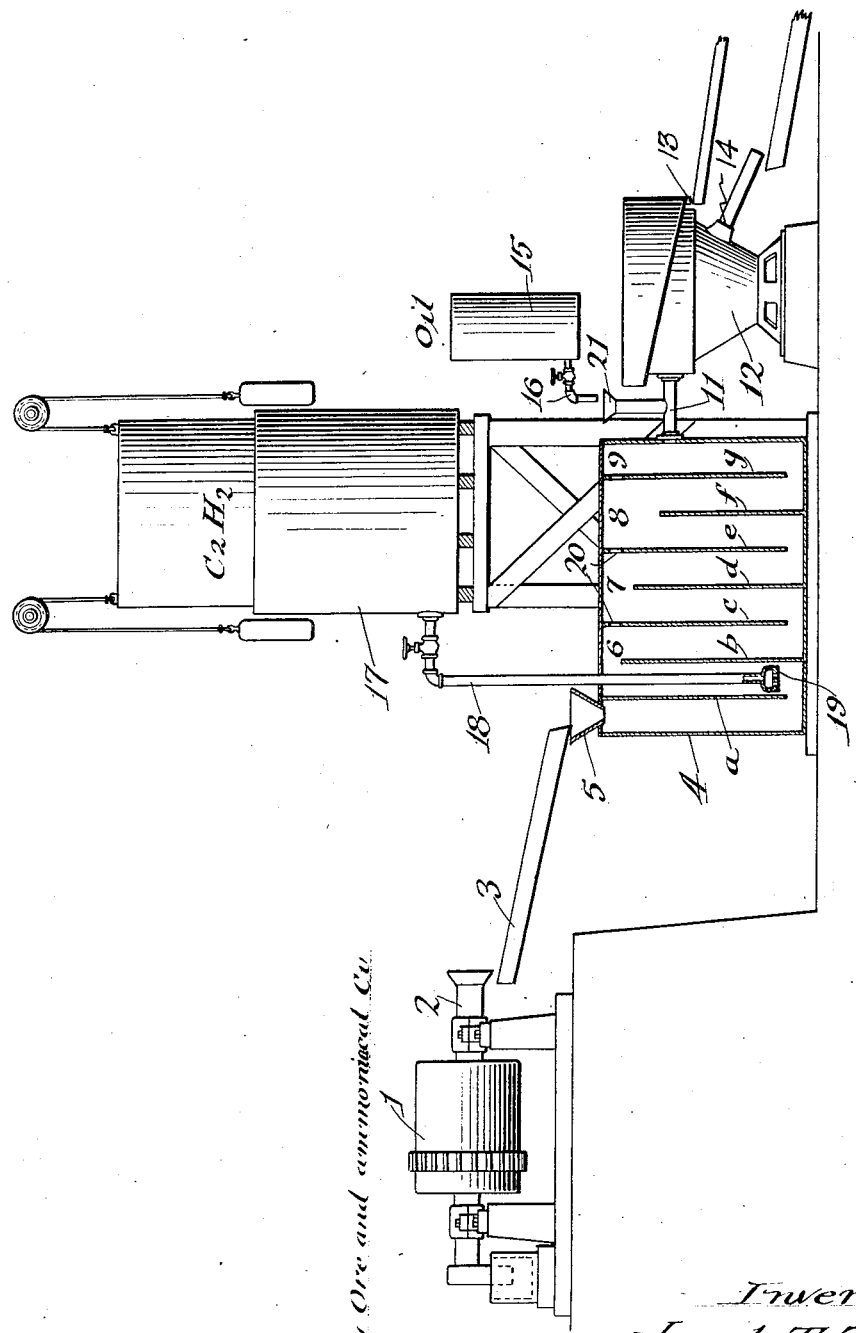
Inventor
Joseph T. Terry.
By Hazard and Miller
Attorneys Patented June 9, 1925.

1,541,293

UNITED STATES PATENT OFFICE.

JOSEPH T. TERRY, OF ALHAMBRA, CALIFORNIA, ASSIGNOR OF ONE-HALF TO JAMES E. LACY AND ONE-EIGHTH TO RICHARD H. LACY, BOTH OF LOS ANGELES CALIFORNIA.

PROCESS OF TREATING ORES.

Application filed October 29, 1924. Serial No. 746,526.

*To all whom it may concern:*

Be it known that I, JOSEPH T. TERRY, a citizen of the United States, residing at Alhambra, in the county of Los Angeles and State of California, have invented new and useful Improvements in Processes of Treating Ores, of which the following is a specification.

My invention relates to a process of treating ores, and especially pulverized ore, tailings and the like, containing metals such as copper, silver or mercury.

It is an object of this invention to treat such ore with a nonacid solution followed by an acetylene treatment to form acetylene derivatives and to separate the desired metal by the flotation process.

This invention is based upon my discovery that the acetylene compounds of copper, silver and mercury are more susceptible to froth flotation concentration than the elemental metals; also on my observation that when acetylene is introduced into a dilute ammoniacal copper solution mixed with finely comminuted copper ore containing the metal in elemental form reduction of the copper in solution to an acetylene derivative takes place on the surface of the elemental copper which becomes filmed with a dark red coating of copper acetylide, $C_2H_2Cu_2O$.

My invention consists in the steps of the process hereinafter described and claimed.

In the accompanying drawings, which form a part of this specification, the figure illustrates in diagram an apparatus suitable for carrying out my process.

In the drawing, 1 represents a ball mill in which the ore is crushed to suitable degree of fineness in an ammoniacal solution containing copper and discharges through a hollow trunnion 2 into a launder 3, by which it is conveyed to a closed rectangular tank 4 provided with a receiving funnel 5 and a series of staggered baffles $a$, $b$, $c$, $d$, $e$, $f$, and $g$, so arranged that the flowing pulp travels in a narrow passage through the pockets 6, 7, 8 and 9. It will be noted that alternate baffles $b$, $d$ and $f$ are of diminishing height to maintain a difference of hydrostatic head and to facilitate the flow of the pulp.

An acetylene generator 17 of any preferred or suitable construction is provided to supply the gas to the tank 4 by means of a valve controlled gage pipe 18, which communicates with a gas nozzle 19 disposed between baffles $a$ and $b$ and the tank 4. Acetylene will bubble through the pulp and rising to chamber 6, will pass thence to chambers 7 and 8, there being openings 20 in baffles $c$ and $e$.

The pulp is conveyed from the last compartment of the tank 4 to a flotation machine 12 by means of a pipe 11, into which a suitable flotation agent, such as wood creosote and cresylic acid, is introduced from a container 15 by means of a duct 16 and hopper 21. Under proper conditions of agitation and aeration the mineral particles form a froth which is separated from the gangue as an overflow at 13, the residue tailings discharging at 14.

Although elemental copper is superficially converted to acetylene compounds when treated with caustic soda, sodium carbonate, calcium hydroxide solutions and acetylene, I have found that best results are obtained with ammonia and ammonia salt solutions containing a small amount of copper.

In carrying out my new process as applied to copper ore, I do not contemplate total dissolution of the metal, but only sufficient to activate the surface of the particles.

Copper in solution may be derived from the ore pulp, or by adding a copper salt to the pulp solution.

I do not limit myself to proportions, but prefer to employ a solution containing one-tenth of one per cent copper combined with ammonia.

I have found five cubic feet of acetylene gas per ton of ore agitated with the pulp in an enclosed tank sufficient to superficially film elemental copper and materially increase its affinity for flotation reagents.

It will be understood by those skilled in the art that I do not limit myself to the particular apparatus employed in carrying out my process, and various changes may be made by those skilled in the art in the construction of the apparatus, as well as in the steps of the process, without departing from the spirit of my invention, as claimed.

I claim:

1. A process of extracting copper from ores, comprising treating pulverized ore containing copper in a non-acid solution containing ammoniacal copper with acetylene to form copper acetylide at least in part, and separating the copper from the pulp by the flotation process.

2. A process of treating ore containing copper in elemental state, comprising pulverizing the ore, making a non-acid pulp, treating the pulp with acetylene to form a small percentage of copper acetylide and separating the copper constituents from the pulp by the flotation process.

3. A process of treating ore containing copper in elemental state, comprising pulverizing the ore, making a non-acid pulp, adding a solution containing approximately one-tenth of one per cent of copper combined with ammonia, treating the pulp with acetylene to form a coating of copper acetylide on the copper particles at least in part, and separating the copper constituents from the pulp by the flotation process.

In testimony whereof I have signed my name to this specification.

J. T. TERRY.